United States Patent
Kang et al.

(10) Patent No.: US 12,474,266 B2
(45) Date of Patent: Nov. 18, 2025

(54) METHOD AND SYSTEM FOR MOIRÉ PROFILIMETRY USING SIMULTANEOUS DUAL FRINGE PROJECTION

(71) Applicants: SAN DIEGO STATE UNIVERSITY (SDSU) FOUNDATION, San Diego, CA (US); CENTRO DE INVESTIGACIONES EN OPTICA A.C., Guanajuato (MX)

(72) Inventors: Sungbum Kang, San Diego, CA (US); Sotero Ordoñes Nogales, Guanajuato (MX)

(73) Assignees: SAN DIEGO STATE UNIVERSITY (SDSU) FOUNDATION, San Diego, CA (US); CENTRO DE INVESTIGACIONES EN OPTICA A.C., Guanajuato (MX)

( * ) Notice: Subject to any disclaimer, the term of this patent is extended or adjusted under 35 U.S.C. 154(b) by 461 days.

(21) Appl. No.: 17/932,551

(22) Filed: Sep. 15, 2022

(65) Prior Publication Data

US 2023/0091424 A1    Mar. 23, 2023

Related U.S. Application Data

(60) Provisional application No. 63/261,313, filed on Sep. 17, 2021.

(51) Int. Cl.
G01N 21/45    (2006.01)
G01B 11/25    (2006.01)

(52) U.S. Cl.
CPC .......... *G01N 21/45* (2013.01); *G01B 11/254* (2013.01); *G01N 2021/456* (2013.01)

(58) Field of Classification Search
CPC . G01N 21/45; G01N 2021/456; G01B 11/254
See application file for complete search history.

(56) References Cited

U.S. PATENT DOCUMENTS 5,406,342 A * 4/1995 Jongsma ............ G01B 11/2531
                                                        351/212

OTHER PUBLICATIONS

Bruning, J., et al., "Digital Wavefront Measuring Interferometer for Testing Optical Surfaces and Lenses," Applied Optics, vol. 13, No. 11, Nov. 1974, pp. 2693-2703.

(Continued)

*Primary Examiner* — Hwa Andrew Lee
(74) *Attorney, Agent, or Firm* — Greer, Burns & Crain, Ltd

(57) ABSTRACT

In alternative embodiments, provided are moiré profilometry methods for analyzing a topography of an object comprising use of dual patterns that are simultaneously projected onto a surface of the object from two symmetric directions. In alternative embodiments, the projected dual patterns superimpose and generate a fringe pattern that contains a moiré pattern, the moiré pattern having a phase that is modulated according to the topography of the object. In alternative embodiments, the moiré pattern is extracted from the fringe pattern using a spatial or temporal method, and the phase is demodulated from the extracted moiré pattern using a spatial or temporal method.

10 Claims, 17 Drawing Sheets

(56) References Cited

OTHER PUBLICATIONS

Chen, L., et al., "Dual Phase-shifting Moiré Projection with Tunable High Contrast Fringes for Three-Dimensional Microscopic Surface Profilometry," Physics Procedia 19 & ICOPEN 2011, 2011, pp. 67-75.
Dirckz, J., et al., "Phase shift method based on object translation for full field automatic 3-D surface reconstruction from moire topograms," Applied Optics, vol. 27, No. 6, Mar. 15, 1988, pp. 1164-1169.
Halioua, M., et al., "Projection moire with moving gratings for automated 3-D topography," Applied Optics, vol. 22, No. 6, Mar. 15, 1983, pp. 850-855.
Larkin, K., et al. "Natural demodulation of two-dimensional fringe patterns: I. General background of the spiral phase quadrature transform," J. Opt. Soc. Am. A, vol. 18, No. 8, Aug. 2001, pp. 1862-1870.
Larkin, K., et al. "Natural demodulation of two-dimensional fringe patterns. II. Stationary phase analysis of the spiral phase quadrature transform," J. Opt. Sci. Am. A, vol. 18, No. 8, Aug. 2001, pp. 1871-1881.
Quiroga, J., et al., "Isotropic n-dimensional fringe pattern normalization," Optics Communications 224, 2003, pp. 221-227.
Servin, M., et al., "The general theory of phase shifting algorithms," Optics Express, vol. 17, No. 24, Nov. 23, 2009, pp. 21867-21881.
Uribe-López, U., et al., "Improvement of fringe quality for phase extraction in double digital fringe projection," Optical Engineering, vol. 58(9), Sep. 2019, pp. 092605-1-092605-7.

\* cited by examiner

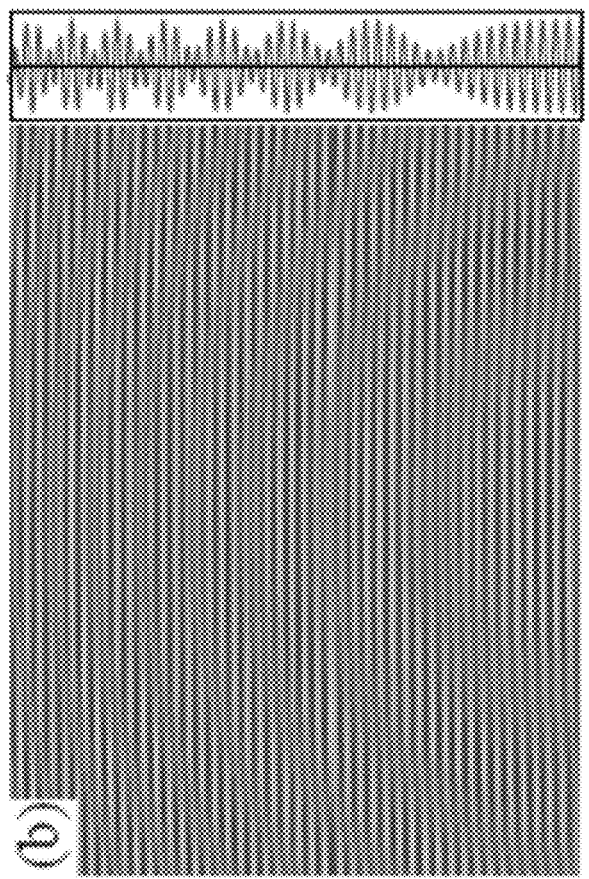
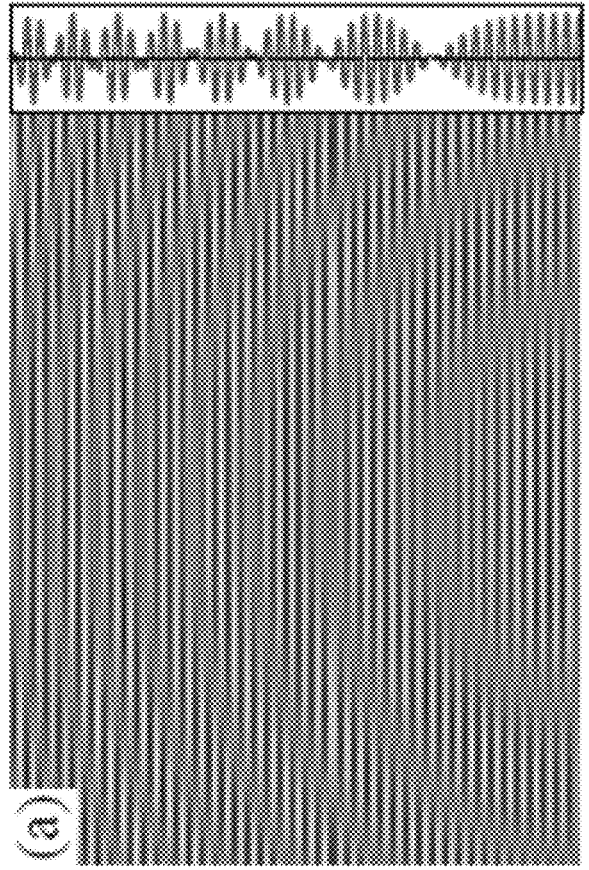
FIG. 3

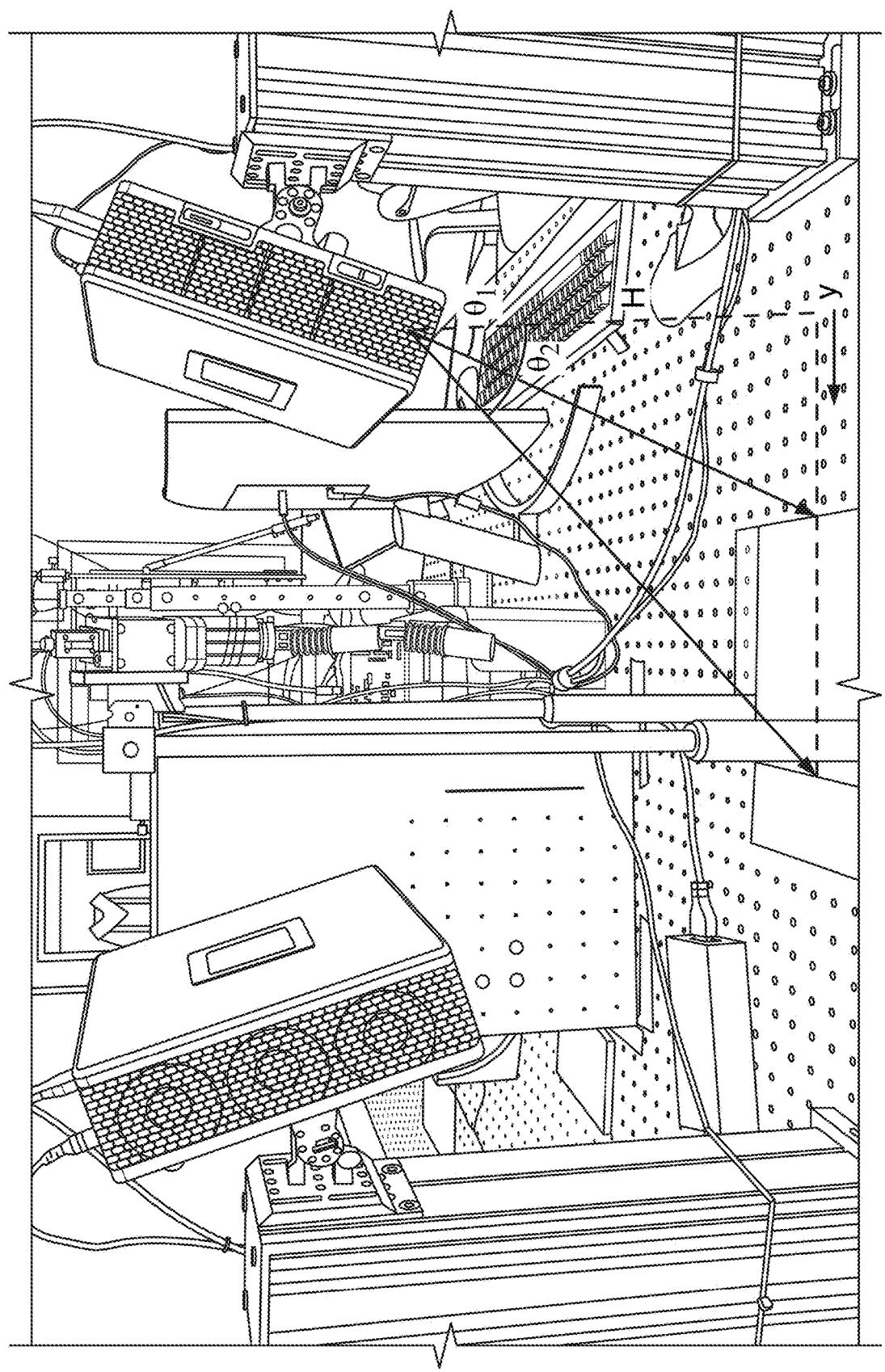

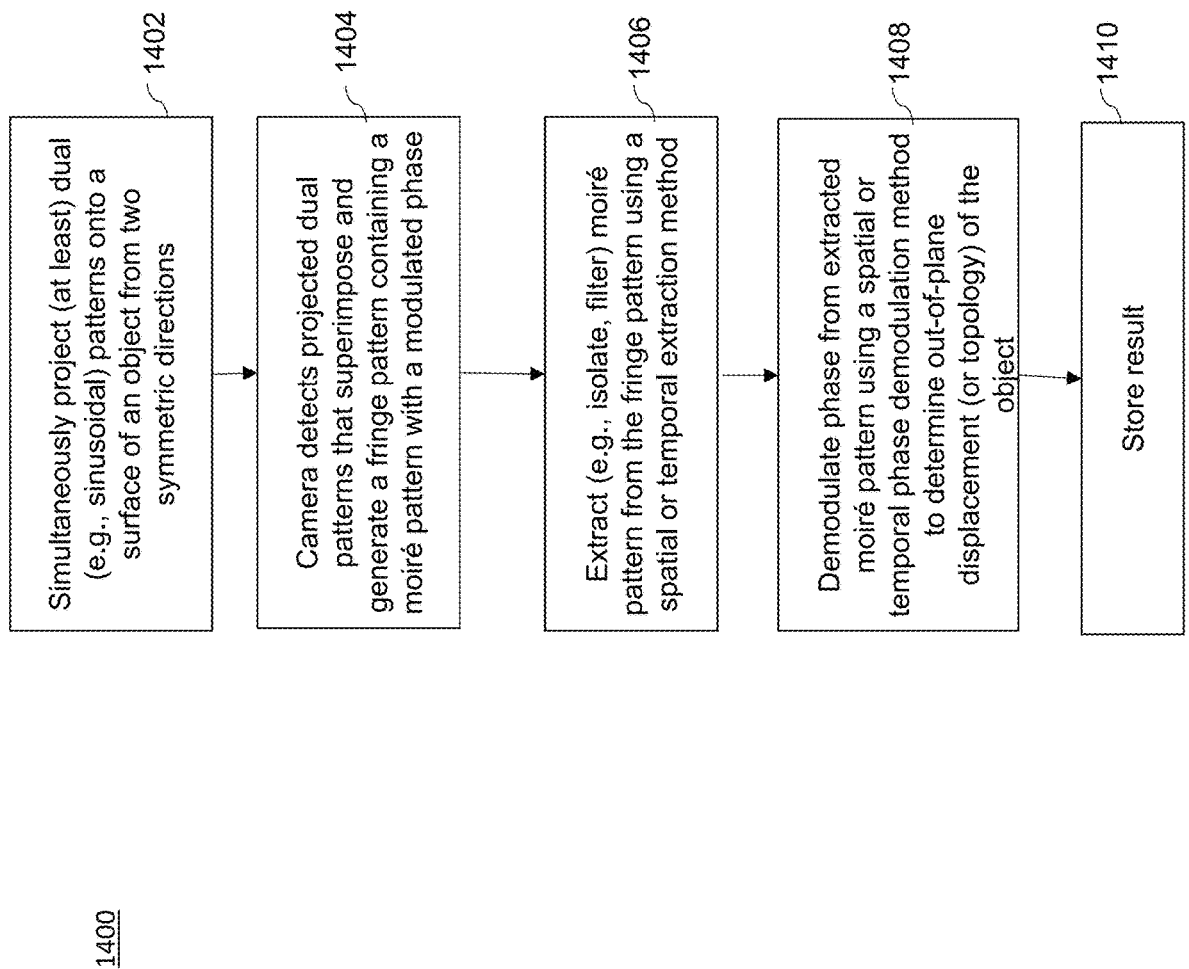

METHOD AND SYSTEM FOR MOIRÉ PROFILOMETRY USING SIMULTANEOUS DUAL FRINGE PROJECTION

PRIORITY AND CROSS-REFERENCE TO RELATED APPLICATIONS

This application claims priority to, and the benefit of, U.S. Provisional Patent Application No. 63/261,313, filed Sep. 17, 2021, which application is incorporated in its entirety by reference herein.

FEDERALLY SPONSORED RESEARCH OR DEVELOPMENT

N/A

FIELD

The present disclosure relates generally to the field of metrology. Embodiments of the invention relate more particularly to methods and systems for moiré profilometry using simultaneous dual fringe projection.

BACKGROUND

Fringe projection profilometry (FPP) is an optical metrology technique that has been widely used for measuring surface topography at a micro or macro scale. FPP involves projecting a fringe pattern onto an object and recording its reflection from a certain direction. The non-flat geometry of the object's surface deforms the reflected fringe pattern, which is phase-modulated according to its topography. The phase distribution can be obtained from the reflected fringe pattern by applying an appropriate fringe analysis method such as a phase shifting algorithm (PSA).

Geometric moiré methods are also widely used for topography measurements. Such methods utilize two gratings, referred to as reference and specimen gratings. The reference grating remains stationary while the specimen grating is deformed according to the topography of the object. The superposition of these gratings generates a moiré pattern that is a low spatial frequency distribution of dark and bright interference bands. The height profile of the object's surface is encoded in the modulating phase of the moiré pattern.

Geometric moiré methods do not require the measurement of a reference in contrast to FPP methods, which commonly need a reference to isolate the topography information from the phase carrier. Geometric moiré methods also can provide high-resolution measurements due to the high sensitivity of the moiré pattern to small changes on the surface topography. However, a significant disadvantage of conventional geometric moiré methods is the poor visibility of the moiré fringes, which can significantly decrease the measurement precision.

Halioua et al., Projection moiré with moving gratings for automated 3-d topography," Appl. Opt. 22, 850-855, 1983, discloses a dual projection moiré technique with the goal of improving the visibility of the moiré fringes. This technique can increase the fringe visibility of the moiré pattern as well as its robustness against noise. Dirckx et al., Phase shift method based on object translation for full field automatic 3-d surface reconstruction from moiré topograms, Appl. Opt. 27, 1164-1169, 1988, discloses a mathematical formation of the moiré fringes observed by the dual projection moiré technique.

Combining benefits of dual projection and PSA has been proposed generally for improving the phase sensitivity in a shadow moiré method. Chen and Tsai, Dual phase-shifting moiré projection with tunable high contrast fringes for three-dimensional microscopic surface profilometry, Phys. Procedia 19, 67-75 (2011), discloses generating the moiré pattern by combining a physical grating and a digitally generated virtual grating, which mimics the dual projection and reduces the issues derived from the fringe acquisition.

For fringe projection, Uribe-Lopez et al., Improvement of fringe quality for phase extraction in double digital fringe projection, Opt. Eng. 58, 1-7, 2019, discloses a dual projection that simultaneously projects digitally generated grayscale sinusoidal patterns onto an object from two symmetric directions. The two sinusoidal patterns superimpose and generate a fringe pattern that contains a moiré pattern that is phase modulated according to the topography of the object. It was observed that the moiré pattern has high fringe visibility. The phase was demodulated by using the Vortex transform method.

However, phase demodulation methods will not be accurate if the moiré pattern has few fringes with low local frequencies. Such patterns are common and are expected in typical profilometry cases.

It would be beneficial to provide moiré profilometry systems and methods that allow more accurate phase demodulation.

SUMMARY

According to one aspect of the disclosed embodiments, a moiré profilometry method for analyzing a topography of an object comprises:

simultaneously projecting dual patterns onto a surface of the object from two symmetric directions, the projected dual patterns superimposing and generating a fringe pattern that contains a moiré pattern, the moiré pattern having a phase that is modulated according to the topography of the object;

extracting, e.g., using a processor, the moiré pattern from the fringe pattern using a spatial or temporal method; and demodulating, e.g., using the processor, the phase from the extracted moiré pattern using a spatial or temporal method.

In embodiments, in combination with any of the above, the projected dual patterns may each comprise a sinusoidal pattern.

In embodiments, in combination with any of the above, the sinusoidal patterns may be digitally generated.

In embodiments, in combination with any of the above, the extraction comprises isolating or filtering, e.g., using the processor, the moiré pattern from the fringe pattern.

In embodiments, in combination with any of the above, the extracting may use a spatial filtering method and the phase demodulation may use a spatial phase demodulation method.

In embodiments, in combination with any of the above, the extracting may use a spatial filtering method and the demodulating may use a temporal phase demodulation method.

In embodiments, in combination with any of the above, the extracting may use a temporal extraction method and the demodulating may use a temporal phase demodulation method.

In embodiments, in combination with any of the above, the spatial filtering method may use (e.g., apply) a Fourier transform and a band-pass filter.

In embodiments, in combination with any of the above, the spatial filtering method may further comprise determining a temporal sequence of the moiré pattern.

In embodiments, in combination with any of the above, the spatial phase demodulation may comprise: using (e.g., apply) a Vortex transform, e.g., using the processor, to estimate a quadrature signal of the moiré pattern; and retrieving, e.g., using the processor, a wrapped phase from the estimated quadrature signal.

In embodiments, in combination with any of the above, the temporal extraction method may use a phase shifting algorithm (PSA).

In embodiments, in combination with any of the above, the temporal extraction method may further comprise determining e.g., using the processor, a temporal sequence of the moiré pattern.

In embodiments, in combination with any of the above, the temporal phase demodulation method may use a phase shifting algorithm (PSA).

In embodiments, in combination with any of the above, the method may further comprise: converting, e.g., using the processor, the demodulated phase to an out-of-plane displacement of the object.

According to other inventive aspects, a system for moiré profilometry comprises the system 100 shown in FIG. 1 herein.

According to other inventive aspects, a system for moiré profilometry comprises:

first and second projectors having exit pupils disposed along a first plane that is separated by a distance from a reference plane, the first and second projectors being configured to simultaneously project dual patterns onto a surface of an object disposed between the reference plane and the first plane such that the projected dual patterns superimpose and generate a fringe pattern that contains a moiré pattern, the moiré pattern having a phase that is modulated according to the topography of the object;

an imaging apparatus having an entrance pupil coplanar with the exit pupils of the first and second projectors, the entrance pupil being configured to receive a reflection of the fringe pattern from the object;

a processor coupled to the imaging apparatus and configured to:

extract the moiré pattern from the fringe pattern using a spatial or temporal method; and demodulate the phase from the extracted moiré pattern using a spatial or temporal method.

In embodiments, in combination with any of the above, the projected dual patterns may each comprise a sinusoidal pattern.

In embodiments, in combination with any of the above, the sinusoidal patterns may be digitally generated.

In embodiments, in combination with any of the above, the extraction may comprise isolating or filtering the moiré pattern from the fringe pattern.

In embodiments, in combination with any of the above, the extracting may use a spatial filtering method and the phase demodulation may use a spatial phase demodulation method.

In embodiments, in combination with any of the above, the extracting may use a spatial filtering method and the demodulating may use a temporal phase demodulation method.

In embodiments, in combination with any of the above, the extracting may use a temporal extraction method and the demodulating may use a temporal phase demodulation method.

In embodiments, in combination with any of the above, the spatial filtering method may use (e.g., apply) a Fourier transform and a band-pass filter.

In embodiments, in combination with any of the above, the spatial filtering method further comprises determining a temporal sequence of the moiré pattern.

In embodiments, in combination with any of the above, the spatial phase demodulation method may comprise: using (e.g., applying) a Vortex transform to estimate a quadrature signal of the moiré pattern; and retrieving a wrapped phase from the estimated quadrature signal.

In embodiments, in combination with any of the above, the temporal extraction method may use a phase shifting algorithm (PSA).

In embodiments, in combination with any of the above, the temporal extraction method may further comprise determining a temporal sequence of the moiré pattern.

In embodiments, in combination with any of the above, the temporal phase demodulation method may use a phase shifting algorithm (PSA).

In embodiments, in combination with any of the above, the processor may be further configured to: convert the demodulated phase to an out-of-plane displacement of the object.

Various examples are disclosed herein.

The details of one or more exemplary embodiments of the invention are set forth in the accompanying drawings and the description below. Other features, objects, and advantages of the invention will be apparent from the description and drawings, and from the claims.

All publications, patents, patent applications cited herein are hereby expressly incorporated by reference in their entireties for all purposes.

DESCRIPTION OF THE DRAWINGS

The drawings set forth herein are illustrative of exemplary embodiments provided herein and are not meant to limit the scope of the invention as encompassed by the claims.

The present disclosure will become more fully understood from the detailed description and the accompanying drawings, wherein:

FIG. 3 shows simulated interferometric patterns corresponding to a parabolic shape when (a) $b_1(r)=b_2(r)$ and (b) $b_2(r)=2b_1(r)$ where $b_1$ and $b_2$ are the fringe modulation functions used in Eq. (2) provided hereinbelow. The fringe visibility of the moiré pattern is better in (a) than (b).

FIG. 9 shows an experimental DFPMP arrangement.

FIG. 14 shows an example method for analyzing a topography of an object.

In the drawings, reference numbers may be reused to identify similar and/or identical elements.

DETAILED DESCRIPTION

Figure 1:
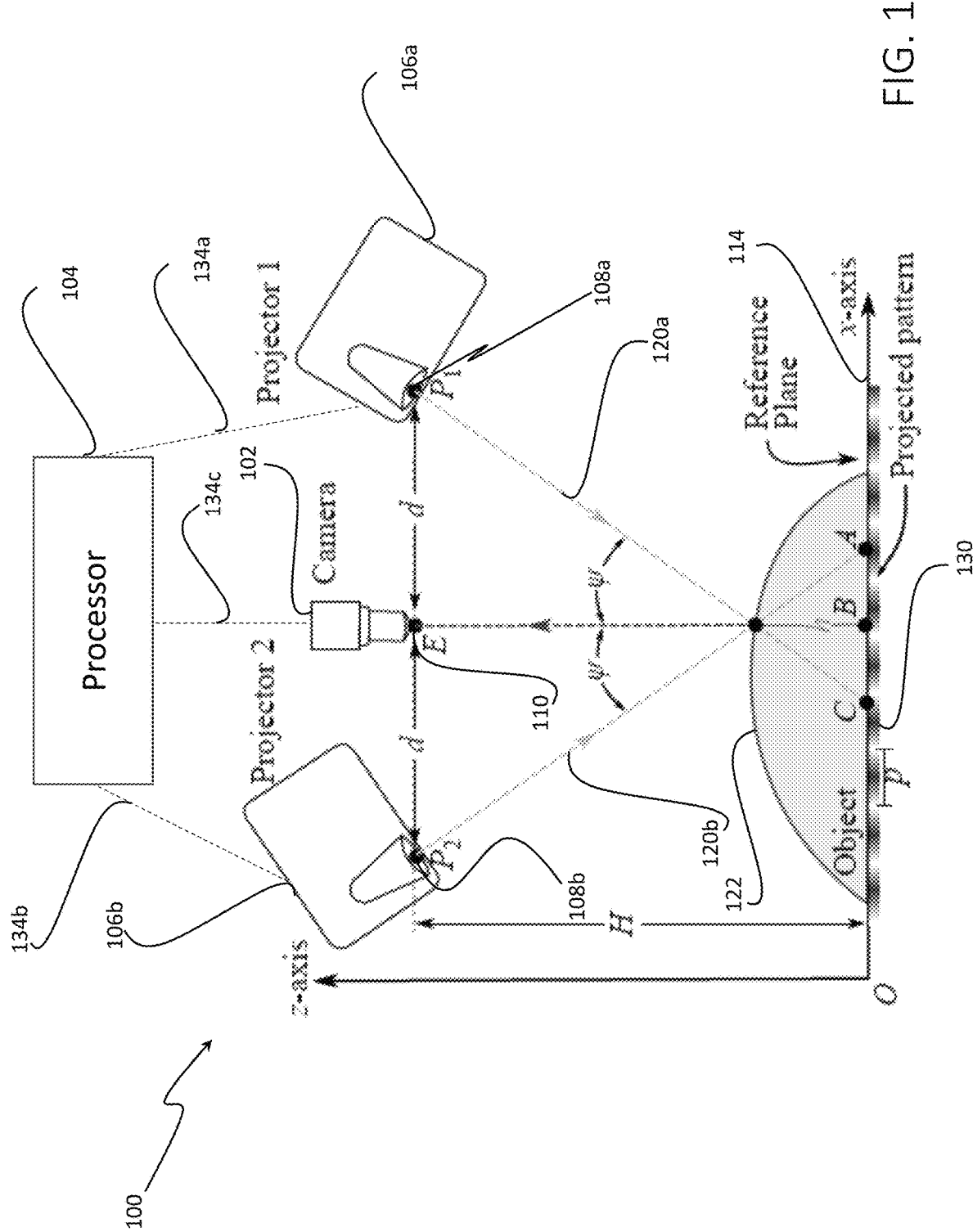
FIG. 1 shows an example dual fringe projection moiré profilometry (DFPMP) arrangement according to an embodiment.

In optical metrology, fringe projection techniques and moiré techniques are widely used, e.g., separately, to measure the topography of objects. Example methods provided herein, among other things, combine advantages of fringe projection and moiré techniques by applying a configuration of simultaneous dual projection in the fringe projection technique. Example methods can employ two fringe patterns that are simultaneously projected on an object to generate a superimposed fringe pattern, referred to herein in example methods as an interferometric pattern. The interferometric pattern contains a moiré pattern that is phase-modulated according to the topography of the object.

Example systems and methods further provide (processor-implemented) phase demodulation of the moiré patterns obtained through such dual simultaneous fringe projection. Generally, this phase demodulation includes extracting (e.g., isolating, filtering, etc.) the moiré patterns from the interferometric pattern and demodulating the phase from the moiré patterns. Various combinations of spatial and temporal methods for the extraction and the phase demodulation can be used to provide alternative example processing methods. Some example methods, referred to herein as spatial methods, can use spatial methods for both moiré pattern extraction and phase demodulation. Other example methods, referred to herein as temporal methods, can use temporal methods (e.g., employing a phase-shifting algorithm (PSA)) for both moiré pattern extraction and for phase demodulating. Still other example methods, referred to herein as spatial-temporal methods, use a spatial extraction method to extract the moiré pattern and a temporal phase demodulation method (e.g., PSA) to demodulate the phase. Experimental results demonstrate that resulting phase maps can have double phase sensitivity compared to that of a classical fringe projection technique.

While any of the example methods can be used for profilometry, one or more of the example methods may be selected for use based on criteria such as but not limited to characteristics of the object's surface, desired image resolution, processing, or data usage, or other criteria. For example, an example spatial method may be more advantageous in some instances when the surface of the object is continuous and highly curved, which can result in a sufficient number of moiré fringes. An example spatial-temporal method, on the other hand, may be more advantageous in some instances when the object's surface does not have small details or shape discontinuities. An example temporal method, as another example, may be more advantageous in some instances for higher-resolution topography measurements.

For purposes of illustrating example embodiments, and not wishing to be bound by theory, an equation describing an intensity distribution of a moiré pattern is derived below. It can be extracted from a superimposed fringe pattern by using a spatial or a temporal filtering procedure. The phase of the moiré pattern can be demodulated by using a spatial or a temporal approach.

Referring now to the figures, FIG. 1 depicts an example system 100 for providing dual fringe projection combined with phase demodulation according to example methods, referred to herein generally as dual fringe projection moiré profilometry (DFPMP). In the example DFPMP system 100, two projectors 106a, 106b (Projector 1, Projector 2) and an imaging apparatus 102 such as but not limited to a camera (Camera), in normal view, are used.

The projectors' exit pupils 108a, 108b and the camera's entrance pupil 110 are on the same plane (e.g., a first plane or sample plane). Along this plane, the distance between the camera 102 (entrance pupil 110) and Projector 1 (exit pupil 108a) is d, and it is the same from the camera (entrance pupil 110) to Projector 2 (exit pupil 108b). The same sensitivity angle, ψ, is used for both projectors 106a, 106b. In FIG. 1, E is the center of the camera's entrance pupil 110 and $P_1$ and $P_2$ are the center of the projectors' exit pupils 108a, 108b, respectively. E, $P_1$, and $P_2$ are assumed to be in the sample plane, whose distance is d along the x-axis. The distance between these pupils and a reference plane (Reference Plane) 114 is termed H. C is the point where the principal ray of Projector 1 hits the reference plane 114 and, analogously, C is for Projector 2 and B is for the camera.

As further shown in FIG. 1, two sinusoidal fringe patterns 120a, 120b (shown as dashed arrows) projected by Projectors 1 and 2 onto an object (Object) 122 superimpose and generate a fringe pattern 130 containing a moiré pattern. The moiré pattern 130 is phase modulated according to the surface shape of the object 122, as demonstrated below.

The camera 102 can be in signal communication (e.g., coupled wired or wirelessly, as illustrated by signal lines 134c) with a processor 104 for receiving signals from the camera 102 corresponding to the reflected patterns, e.g., the fringe pattern, received by the camera's entrance pupil 110. The signal may correspond to, for instance, light or other electromagnetic signal intensity. The processor 104 is configured to receive the signals from the camera 102 and process the signals to analyze, e.g., determine, measure, etc., a topography of the object 122 including the height (with respect to the reference plane 114) of various locations or points along the object's surface according to one or more example methods provided herein. The processor 104 may be configured for performing any or all of the processing methods, and if more than one method is available, the processor may employ one or more selected methods. A processor may be embodied in one or more processors, and reference to a "processor" herein can also include reference to more than one processor, e.g., operating in parallel or in series, operating to perform separate or combined processing steps, etc.

The processor 104 may also be in communication with (e.g., coupled wired or wirelessly as illustrated by signal lines 134a, 134b, 134c) to the camera 102 and/or the projectors 106a, 106b to perform one or more of: controlling operation of the projectors, including providing and/or generating the sinusoidal fringe patterns to be projected; controlling the phase shift of the sinusoidal fringe patterns to be projected; controlling timing of the projections 120a, 120b; and/or controlling operation of the camera 102.

FIG. 14 shows an example method 1400, e.g., a moiré profilometry method, for analyzing a topography of an object. At 1402, the projectors 106a, 106b simultaneously project (at least) dual patterns onto a surface of the object (e.g., object 122) from two symmetric directions. 'Simultaneously project' refers to the projected image patterns, such as dual image patterns from the projectors 106a, 106b, being realized at the same time on the object 122. At 1404, the projected dual patterns superimpose and generate a fringe pattern containing a moiré pattern having a phase (a modulated phase) that is modulated according to the topography of the object. This fringe pattern can be detected using the camera's 102 entrance pupil (which in the same plane as the exit pupils of the projectors). The processor 104 coupled to the camera is used to extract (e.g., isolate, filter) moiré pattern from the fringe pattern using a spatial or temporal extraction method at 1406, examples of which are provided in more detail below. At 1408 the processor 104 demodulates the phase from extracted moiré pattern using a spatial or temporal phase demodulation method, examples of which are provided in more detail below. This can be used to analyze (e.g., determine, measure, etc.) out-of-plane displacement (or topology) of the object. At 1410, one or more results of the processing may be stored in any suitable media, used in further processing (e.g., downstream analysis, image processing or generation, surface (e.g., object surface) reconstruction, statistical or comparative analysis, etc.), generation of any results for display on a display, etc., printed, transmitted, or any combination.

Example processing methods will now be described. Because the projectors 106a, 106b are inclined with respect to the camera 102, the projected fringe pattern can have non-uniform pitch. To compensate for the nonuniform pitch, a variable pitch can be employed in the pixel domain of the projector 106a, 106b to have uniform pitch on the projected pattern 130 in the spatial domain. The variable pitch can be calculated, e.g., using the following equation:

$$P(y) = \frac{\arctan(P_s/H + \tan(\theta_1 + \Delta\theta y)) - \theta_1}{\Delta\theta} - y$$

where y is the projector's pixel coordinate in the projection direction, H is the distance between the projectors' exit pupils and the reference plane (e.g., in mm), and $\theta_1$ and $\theta_2$ are the smallest and largest sensitivity angles of the projected pattern, respectively, as depicted, for instance, in FIG. 9. FIG. 9 shows an example experimental dual fringe projection moiré profilometry (DFPMP) setup indicating examples for $\theta_1$, $\theta_2$, y, and H. P(y) is the fringe pitch in pixels as a function of y, $P_s$ is the fringe pitch (e.g., in mm) in the spatial domain, $\Delta\theta=(\theta_2-\theta_1)/L$, and L is the number of pixels of the projector in the projection direction.

Figure 10:
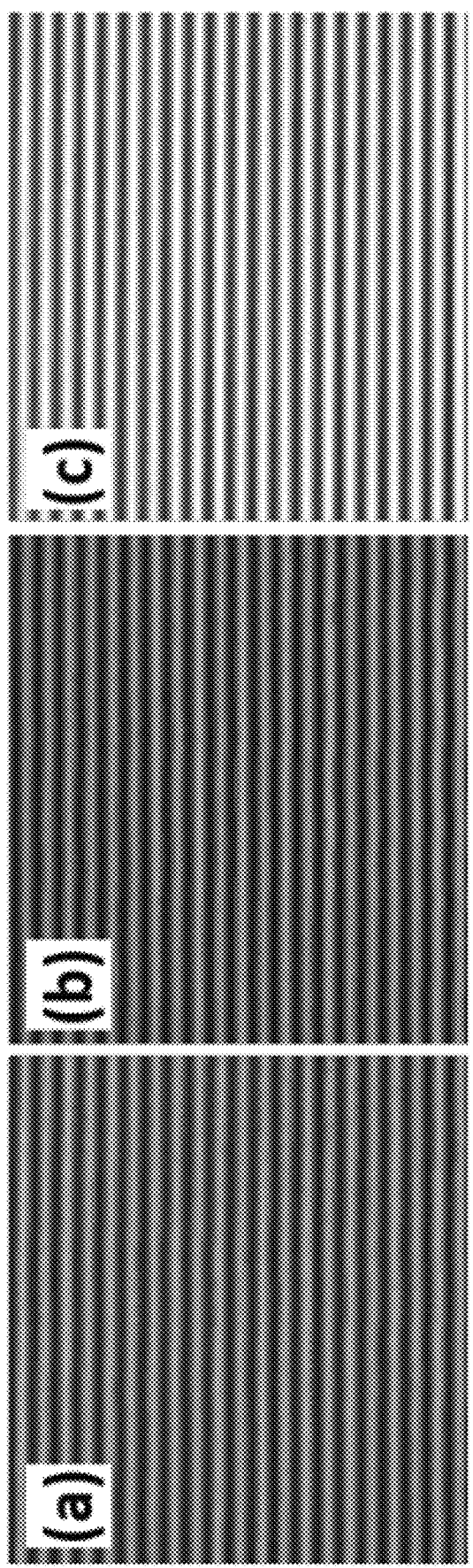
FIG. 10 shows results of projector calibration to project uniform fringe pitch on an object, where: (a) the sinusoidal pattern is projected by the left side projector and captured by the camera, (b) the sinusoidal pattern is projected by the right-side projector and captured by the camera, (c) the superimposed sinusoidal pattern is captured by the camera. The results in FIG. 10 show uniform pitch.

FIG. 10 shows example results. Because the two sinusoidal patterns projected by the two projectors in opposite directions can have uniform pitches, their superimposed pattern can contain only a sinusoidal fringe pattern with the same pitch and increased intensity.

The out-of-plane displacement of the object, given by h and shown by example in FIG. 1, can be determined by $$h = \frac{H}{1 + \frac{2\pi}{p}\frac{d}{\Delta\varphi}} \tag{1}$$

where p is the fringe pitch that is uniform throughout the fringe pattern and $\Delta\phi=\phi B-\phi A+\phi B-\phi C$ that is the phase in the moiré pattern. $\phi A$, $\phi B$, $\phi C$ are the phases at points A, B and C, from projector 1, projector 2, and both projectors, respectively. A phase-to-height calibration method (e.g., see Halioua et al. Optical three-dimensional sensing by phase measuring profilometry," Opt. Lasers Eng. 11, 185-215, 1989) can be used to convert from the phase to the height.

The superimposed fringe pattern will now be mathematically described. This pattern can be referred to as an interferometric pattern because of analogous effects of the superposition and interference. Let c(r) be the spatial carrier of the sinusoidal patterns projected onto an object. Then, over the object, the interferometric pattern can be mathematically described by $$I(r)=a_1(r)+b_1(r)\cos[\varphi(r)+c(r)]+a_2(r)+b_2(r)\cos[-\varphi(r)+c(r)] \tag{2}$$

where r=r(x,y) is the position, $\phi(r)$ is the modulated phase, $a_1(r)$ and $a_2(r)$ are the background intensities, $b_1(r)$ and $b_2(r)$ are the fringe modulation functions of the two sinusoidal fringe patterns, and c(r) is the spatial carrier. Using Euler's formula and algebraic manipulations, one can rewrite Eq. (2) as follows $$I(r) = a(r) + \frac{1}{2}e^{ic(r)}\{2b_1(r)\cos\varphi(r) + [b_2(r) - b_1(r)]e^{-i\varphi(r)}\} + \frac{1}{2}e^{-ic(r)}\{2b_1(r)\cos\varphi(r) + [b_2(r) - b_1(r)]e^{i\varphi(r)}\} \tag{3}$$

where $i=\sqrt{-1}$, and $a(r)=a_1(r)+a_2(r)$. Considering the spatial carrier $c(r)=u_0 x$, the spatial spectrum of Eq. (3) above can be given by $$I(q)=\mathcal{F}_r\{I(r)\}=A(q)+C(q-q_0)+C^*(-q-q_0)+D(q-q_0)+D^*(-q-q_0) \tag{4}$$

where $\mathcal{F}_r\{\cdot\}$ is the operator of the spatial Fourier transform, q=q(u,v) is the spectral spatial position, $q_0$ is the carrier that can be denoted as $q_0=q(u_0, 0)$ rad/pixel, the upper asterisk denotes complex conjugation, $C(q)=\mathcal{F}_r\{2b_1(r)\cos\phi(r)\}$, and $D(q)=\mathcal{F}_r\{b_1(r)-b_2(r)]\exp[i\phi(r)]\}$.

Figure 2:
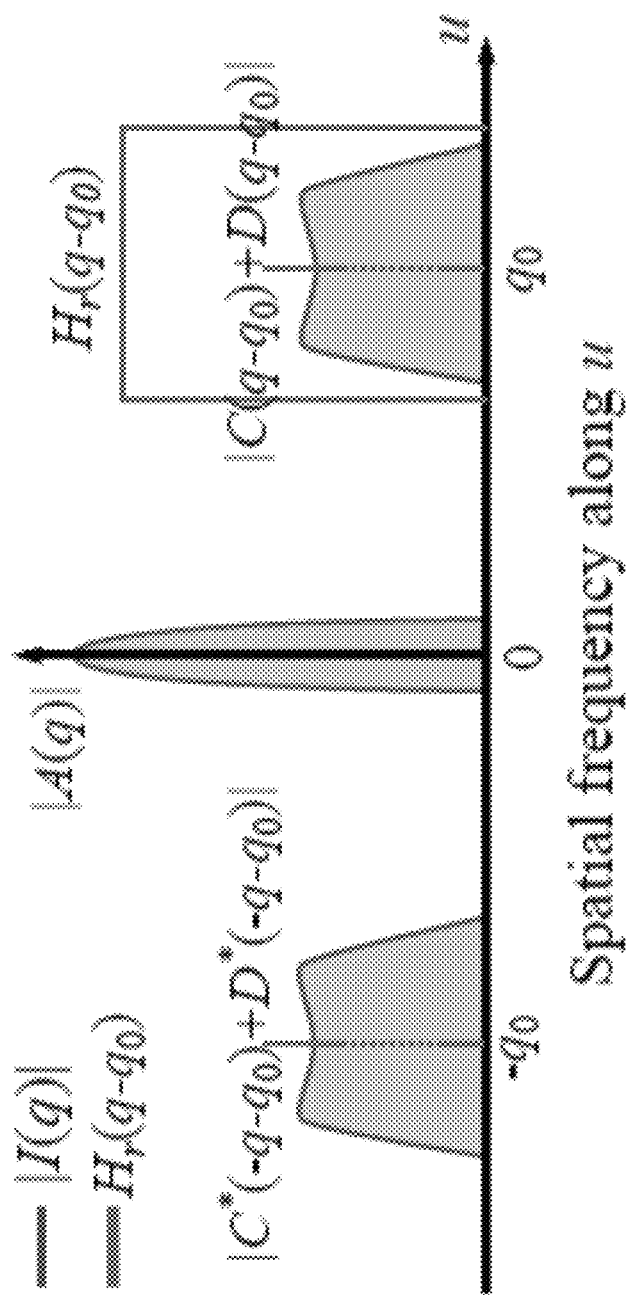
FIG. 2 shows an example spatial spectrum magnitude of an interferometric pattern, and (indicated via a light rectangle) an ideal band-pass filter.

Based on Eq. (4), the spectral components $C(q-q_0)$ and $D(q-q_0)$ overlap one another, as do $C^*(-q-q_0)$ and $D^*(-q-q_0)$. FIG. 2 depicts a spatial spectrum of the interferometric pattern where three main spectral components and the spectral overlapping are observed. FIG. 2 also depicts an ideal band-pass filter (shown as a rectangle in FIG. 2) to remove undesired frequency components in the frequency domain. After filtering out the undesired frequency components in the spectrum I(q), the remaining signal, which is the analytic signal, can be expressed as $$z(r) = BPF\{I(r)\} \quad (5)$$

$$= \frac{1}{2}e^{jc(r)}\{2b_1(r)\cos\varphi(r) + [b_2(r) - b_1(r)]e^{-i\varphi(r)}\}$$

where BPF{•} is the operator of the band-pass filter. Using this analytic signal, the intensity distribution of the moiré pattern can be obtained by $$G(r)=|z(r)|^2=\propto(r)+\beta(r)\cos[2\varphi(r)] \quad (6)$$

where $\propto(r)=[b_1^2(r)+b_2^2(r)]/4$ and $\beta(r)=b_1(r)b_2(r)/2$.

Eq (6) shows that the best fringe visibility of the moiré pattern occurs when $b_1(r)=b_2(r)$. As an example, FIG. 3 compares two interferometric patterns generated by using Eq. (2). It shows that the visibility of the moiré pattern is better when the fringe modulation functions $b_1$ and $b_2$ are equal.

Example spatial, spatial-temporal, and temporal methods for phase demodulation will now be disclosed. These are used in example profilometry methods herein for retrieving the wrapped phase from the moiré pattern.

Spatial Phase Demodulation (1 Image)

In an example spatial phase demodulation method, which may include features of a spatial phase demodulation method proposed in Uribe-Lopez et al, Improvement of fringe quality for phase extraction in double digital fringe projection," Opt. Eng. 58, 1-7, 2019, first, a Fourier transform and a Gaussian band-pass filter are used to extract the moiré pattern from the interferometric pattern. The resulting analytic signal obtained from Equations (4) and (5) can be expressed as $$z(r)= \mathcal{F}_r^{-1}\{C(q-q_0)+D(q-q_0)\}= \mathcal{F}_r^{-1}\{I(q)H_r(q-q_0)\} \quad (7)$$

Where $\mathcal{F}_r^{-1}\{\bullet\}$ is the operator of the spatial inverse Fourier transform, and $H_r(q)$ is the frequency response of the filter. By employing the Fourier transform, one can determine the spatial carrier $q_0$ straightforwardly. Then, the intensity distribution of the moiré pattern can be derived from Eq. (6). By using the Vortex transform (e.g., as disclosed in T. Kreis, "Digital holographic interference-phase measurement using the Fourier-transform method," J. Opt. Soc. Am. A 3, 847-855 (1986); K. G. Larkin, D. J. Bone, and M. A. Oldfield, "Natural demodulation of two-dimensional fringe patterns. i. general background of the spiral phase quadrature transform," J. Opt. Soc. Am. A 18, 1862-1870 (2001); and K. G. Larkin, "Natural demodulation of two-dimensional fringe patterns. ii. stationary phase analysis of the spiral phase quadrature transform," J. Opt. Soc. Am. A 18, 1871-1881 (2001)), the quadrature signal of the moiré pattern can be estimated as $$s(r)=\hat{G}-iQ\{\hat{G}(r)\}=\cos 2\varphi(r)+i\sin 2\varphi(r)=e^{i2\varphi(r)} \quad (8)$$

where $Q\{\cos\varphi(r)\}=-\sin\varphi(r)$ indicates the Vortex transform, and $\hat{G}(r)$ is the fringe-normalized moiré pattern obtained by utilizing the technique disclosed by J. A. Quiroga and M. Servin, "Isotropic n-dimensional fringe pattern normalization," Opt. Commun. 224, 221-227 (2003).

The wrapped phase can then be retrieved as $$\mathcal{W}\{2\varphi(r)\}=\arg[s(r)]; \quad (9)$$

Where $\mathcal{W}\{\bullet\}$ is the wrapping operator, and arg {•} obtains the angle of the complex number.

This example spatial phase demodulation method requires only one interferometric pattern for the phase retrieval, which enables fast data acquisition. However, the Fourier transform may not preserve sharp edges well, and the spectral component $|C(q-q_0)+D(q-q_0)$ can be broadband and be overlapped to A(q) and $|C^*(-q-q_0)+D^*(-q-q_0)$ highly-curved or non-continuous surfaces. In this case, the Gaussian filter $H_r(q)$ can remove the details of the desired signals. In addition, the Vortex transform may produce errors when the local frequencies of the moiré pattern are very low, i.e., when the phase is through the phase demodulation of the moiré pattern, which will decrease the accuracy of the phase estimation. This smoothing issue may propagate through the phase demodulation of the moiré pattern, which may decrease the accuracy of the phase estimation.

Spatial-Temporal Phase Demodulation 3 Images)

A potential solution to overcome smoothing issues of the above example spatial phase demodulation method is to apply a phase-shifting algorithm (PSA) on temporally phase-shifted moiré patterns. To describe the phase-shifted moiré patterns, the temporal carrier can be introduced into Eq. (2) above. The temporal sequence of the interferometric patterns can be expressed as $$I(r,n)=a_1+b_1(r)\cos[\varphi(r)+c(r)+\omega_0 n]+a_2(r)+b_2(r)\cos[-\varphi(r)+c(r)]; \quad (10)$$

where n=0, 1, ..., N−1 is the temporal index, N is the number of phase shifts, and $\omega_0=2\pi/N$ is the temporal carrier. By applying the Fourier transform and Gaussian filter on Eq. (10), the temporal sequence of the moiré patterns can be obtained as $$G(r,n)=|z(r,n)|^2=\propto(r)+\beta(r)\cos[2\varphi(r)-\omega_0 n] \quad (11)$$

The temporal spectrum of this sequence can be given by $$G(r, \omega) = \quad (12)$$
$$\mathcal{F}_t\{G(r, t)\} = \alpha(r)\delta(\omega) + \frac{\beta(r)}{2}e^{-i2\varphi(r)}\delta(\omega - \omega_0) + \frac{\beta(r)}{2}e^{i2\varphi(r)}\delta(\omega + \omega_0);$$

where $\delta(\bullet)$ is Dirac's delta function.

Figure 4:
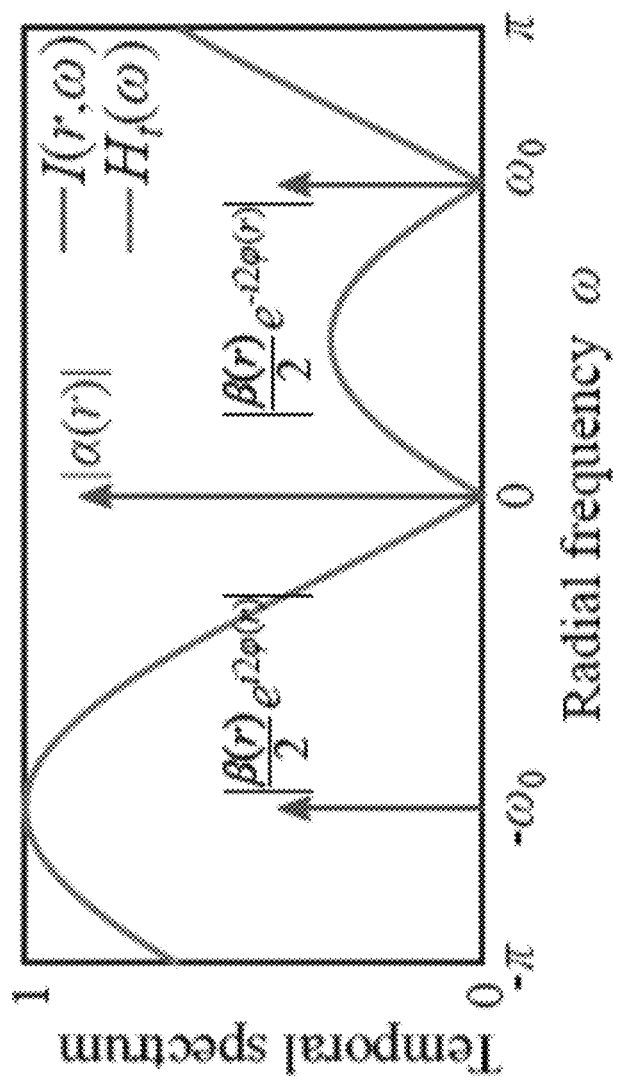
FIG. 4 shows a normalized magnitude of the temporal spectrum of the moiré pattern described in Eq. (12) below, and the frequency response of a 3-step least-squares PSA (LS-PSA) method. Temporal filtering isolates the left-side component having the correct sign of the phase.

FIG. 4 depicts temporal spectrum (normalized magnitude) of the interferometric data described in Equation (12). This spectrum shows that the three spectral components are well separated from one another. Temporal filtering can, for instance, isolate the left-side component in FIG. 4 having the correct sign of the phase.

Based on Eq. (12), the PSA's frequency transfer function (FTF) should fulfill the following quadrature conditions:

$$H_t(0)=0, H_t(\omega_0)=0, \text{ and } H_t(-\omega_0)\neq 0 \quad (13)$$

To meet these quadrature conditions, an example method can use the complex-conjugated coefficients of the 3-step least-squares (LS-) PSA disclosed in Bruning et al., "Digital wavefront measuring interferometer for testing optical surfaces and lenses," Appl. Opt. 13, 2693-2703 (1974). FIG. 4 shows the FTF of the LS-PSA, which confirms that the coefficients will isolate the desired spectral component. Following an FTF formalism for PSAs, e.g., as disclosed in M. Servin et al., "The general theory of phase shifting algorithms," Opt. Express 17, 21867-21881 (2009), the PSA's impulsive response can be obtained by $$h(t) = \mathcal{F}_t^{-1}\{H_t(\omega)\} = \sum_{n=0}^{N-1} c_n \delta(t-n) \qquad (14)$$

$$= \sum_{n=0}^{N-1} e^{-i2n\pi/N} \delta(t-n),$$

where $c_n$ are the PSA's coefficients. The searched analytic signal and the retrieved wrapped phase can then be obtained as follows:

$$s(r) = \frac{\beta(r)}{2}e^{i2\varphi(r)} = G(r,t) * h(t)|_{t=N-1} = \sum_{n=0}^{N-1} c_n^* G(r,n); \qquad (15)$$

$$\mathcal{W}\{2\varphi(r)\} = \arg\left[\frac{\beta(r)}{2}e^{i2\varphi(r)}\right] \qquad (16)$$

where * indicates a temporal convolution operation. While an example PSA is provided above for illustration, example methods can use any PSA accomplishing the quadrature conditions in Eq. (13) for phase demodulation of the moiré patterns. though additional data acquisition time may be used, the phase estimated by an example spatial-temporal method can avoids potential errors that may be caused by the Vortex transform method in the example spatial method.

Temporal Phase Demodulation (≥9 Images)

To retain high-frequency components from the searched spectral component which may be otherwise eliminated by the Fourier transform and the spatial band-pass filter, a PSA can be employed in example methods to extract the moiré patterns from the interferometric patterns. An example PSA uses M sets of N sinusoidal fringe patterns, i.e., a total of MN interferometric patterns. The m-th set of interferometric patterns can be expressed as $$I_m(r,n)=a_1(r)+b_1(r)\cos[\varphi(r)+c(r)+\omega_0 n]+a_2(r)+b_2(r)\cos[-\varphi(r)+c(r)+(n+m)\omega_0]. \qquad (17)$$

For instance, an example temporal phase demodulation method will use at least nine interferometric patterns when N=3 and M=3. Using Euler's formula and algebraic manipulations, one can rewrite Eq. (17) as $$I_m(r,n) = a(r) + \frac{1}{2}e^{i\vartheta_n}\{2b_1(r)\cos\gamma_m + [b_2(r) - b_1(r)]e^{-i\gamma_m}\} + \qquad (18)$$
$$\frac{1}{2}e^{-i\vartheta_n}\{2b_1(r)\cos\gamma_m + [b_2(r) - b_1(r)]e^{i\gamma_m}\};$$

where $\vartheta_n = c(r)+\omega_0 n$ and $\gamma_m = -\omega_0 m$. Eq. (18) shows that the index n shifts the phase of the spatial carrier, while the index m shifts that of the moiré pattern.

Based on Eq. (18), the temporal spectrum of the m-th sequence can be given by $$I_m(r,\omega)=a(r)\,\delta(\omega)+\tfrac{1}{2}\zeta_1(r,m)\,\delta(\omega-\omega_0) \qquad (19)$$

where, $$\zeta_1(r,m)=e^{ic(r)}\{2b_1(r)\cos\gamma_m+[b_2(r)-b_1(r)]e^{-i\gamma_m}\}, \qquad (20)$$

$$\zeta_2(r,m)=e^{-ic(r)}\{2b_1(r)\cos\gamma_m+[b_2(r)-b_1(r)]e^{i\gamma_m}\}. \qquad (21)$$

Eq. (19) shows that the temporal spectrum is composed of three Dirac's deltas, as shown by example in FIG. 5. Therefore, the FTF of the PSA should fulfill the following conditions:

$$H_1(0)=0, H_1(-\omega_0)=0, \text{ and } H_1(\omega_0)\neq 0. \qquad (22)$$

When $H_1(\omega)$ is the FTF of the example 3-step LS-PSA, one can obtain the searched analytic signal as $$s(r,m) = \frac{1}{2}\zeta_1(r,m) = \sum_{n=0}^{N-1} e^{-i2\pi n/N} I_m(r,n). \qquad (23)$$

Figure 5:
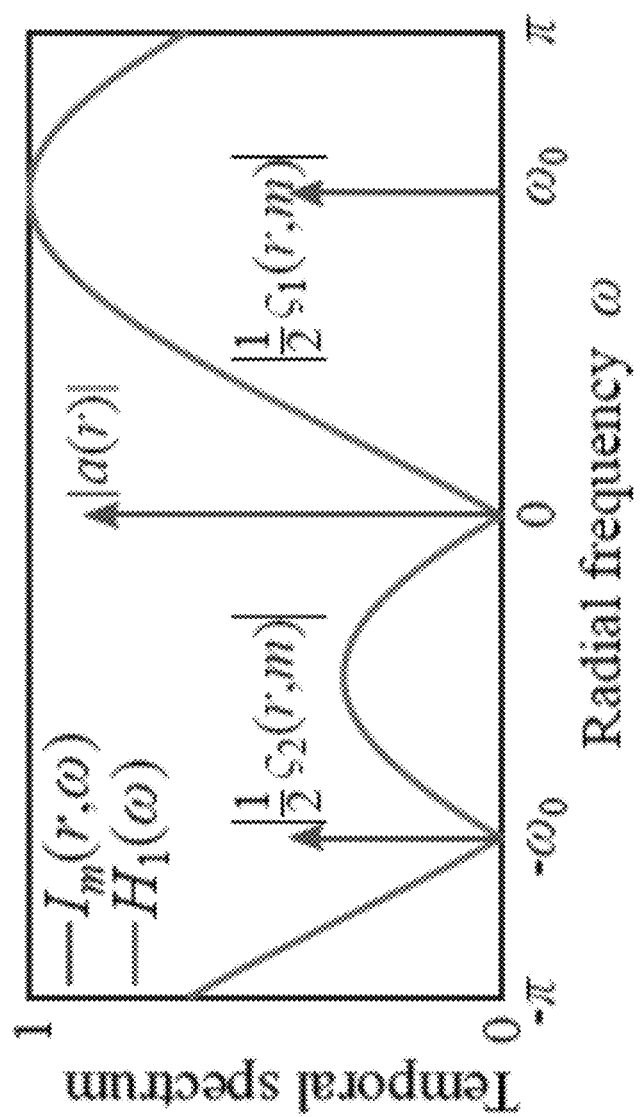
FIG. 5 shows normalized magnitude of the m-th set of the acquired interferometric patterns described in Eq. (19) below. The frequency response of the 3-step LS-PSA is plotted. The temporal filtering isolates the right-side component having the correct sign of the phase.

This example temporal filtering process is shown in FIG. 5. The temporal sequence of moiré patterns can be obtained as follows $$G(r,m)=|s(r,m)|^2=\alpha(r)+\beta(r)\cos[2\varphi(r)-\omega_0 m], \qquad (24)$$

for all m=0, 1, . . . , M−1. It can be observed that equations (24) and (11) are analogous. Thus, one can demodulate the wrapped phase of the temporal sequence of the moiré patterns using Equation (15) and Equation (16).

Simulation and laboratory experiments were conducted to evaluate the quality of example phase demodulation methods. A testing phase map was used for the evaluation: a continuous phase function defined in terms of a linear combination of the Zernike polynomials; and a piecewise phase function defined in terms of rectangular functions.

Simulation Experiments

The example evaluation used the phase function described by the following equation:

$$\varphi(x,y) = \frac{2\pi}{3}\Big[3 - 4.5x - 3(1 - 6y^2 - 6x^2 + 6y^4 + 6x^4 + 12x^2y^2) + \qquad (25)$$
$$8(5xy^4 - 10x^3y^2 + x^5) + (3x - 12xy^2 - 12x^3 + 10xy^4 + 20x^3y^2 + 10x^5) +$$
$$(-4y^3 + 12x^2y + 5y^5 - 10x^2y^3 - 15x^4y)\Big].$$

Figure 6:
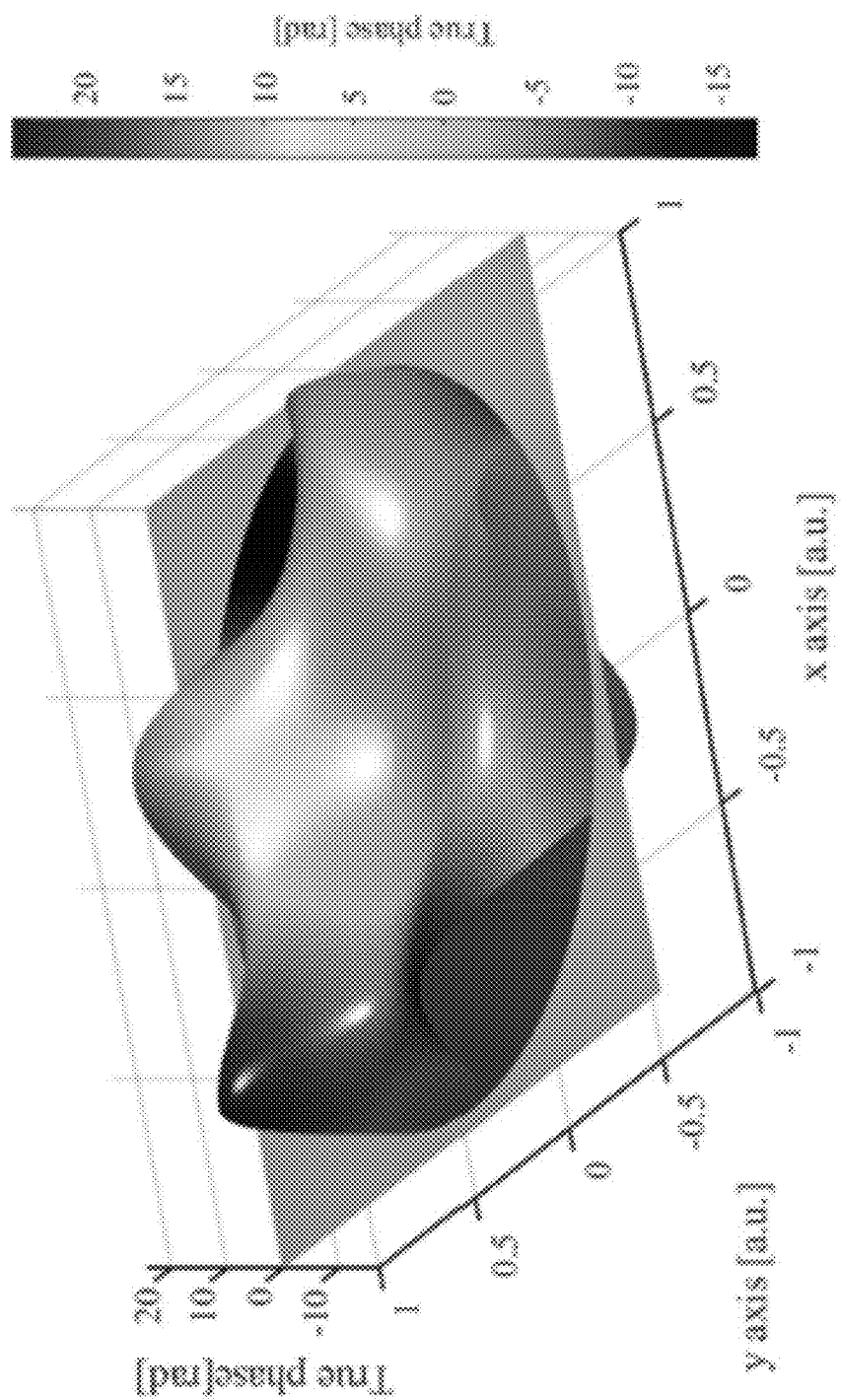
FIG. 6 is a color plot of the true phase to be retrieved in an example experiment. This phase function is described by a linear combination of Zernike polynomial as in an example phase function for 4)(x,y) as set out in Eq. (25) below.

In terms of Zernike polynomials, the above phase function corresponds to the piston, tilt about the y axis, third-order spherical aberration, pentagonal fourth-order astigmatism, fourth-order coma along the x axis, and triangular fourth-order astigmatism with the base parallel to the y axis. FIG. 6 depicts this phase function plotted in the unity-circle. The same $b_1(r)$ and $b_2(r)$ were applied to maximize the fringe visibility of the moiré pattern. No noise was added to the simulated fringe patterns to evaluate and compare the estimation accuracy of the three methods.

Figure 7:
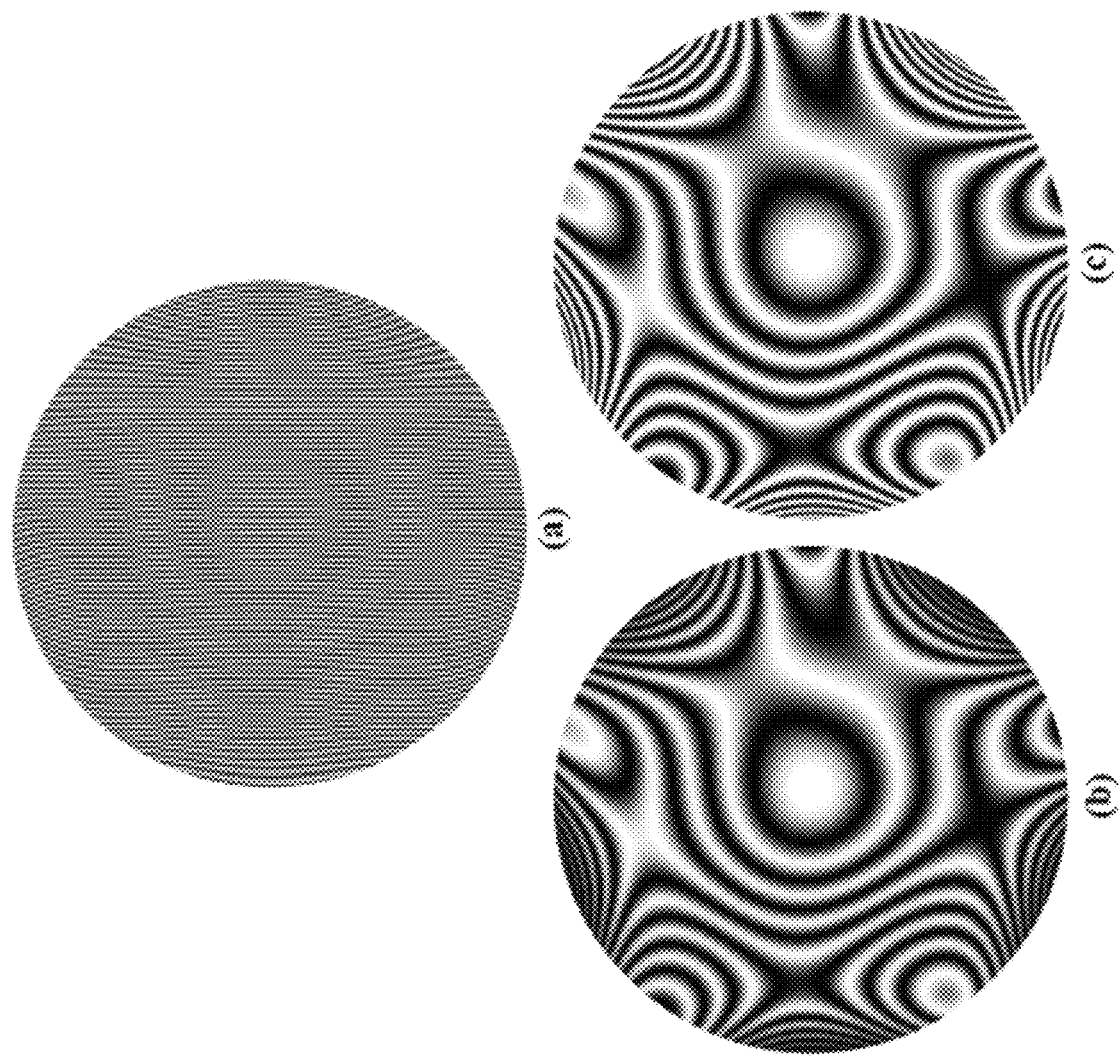
FIG. 7 shows data for an evaluation, including: (a) the interferometric pattern; (b) the moiré pattern estimated by using an example spatial method; and (c) the moiré pattern estimated by using an example temporal filtering method.

FIG. 7(a) shows one of the synthetic interferometric patterns that contains a moiré pattern. The moiré pattern can be seen clearly as the envelope function. According to an example method to extract the moiré patterns from the interferometric patterns, the spatial band-pass filter can be applied on a single interferometric pattern in the frequency domain, and then Eq. (6) can be used to estimate the intensity of the moiré pattern, as disclosed above.

FIG. 7(b) shows the moiré pattern extracted by using this first example method. It can be observed that the example method performed well and the moiré intensity was estimated correctly, though the estimation quality was lower around the border of the unit circle. This method can be employed to extract the moiré patterns in example spatial and spatial-temporal phase demodulation methods.

The second simulated method extracted the moiré pattern by using temporal filtering through the PSA. This method used at least three interferometric patterns to obtain one moiré pattern. For the numerical experiments, three interferometric patterns were used. The moiré pattern extracted by using this example method, shown in FIG. 7(c), demonstrates that the estimation was correct even around the borders of the unit circle. This example method can be employed to extract the moiré patterns in example temporal phase demodulation methods.

Figure 8A:
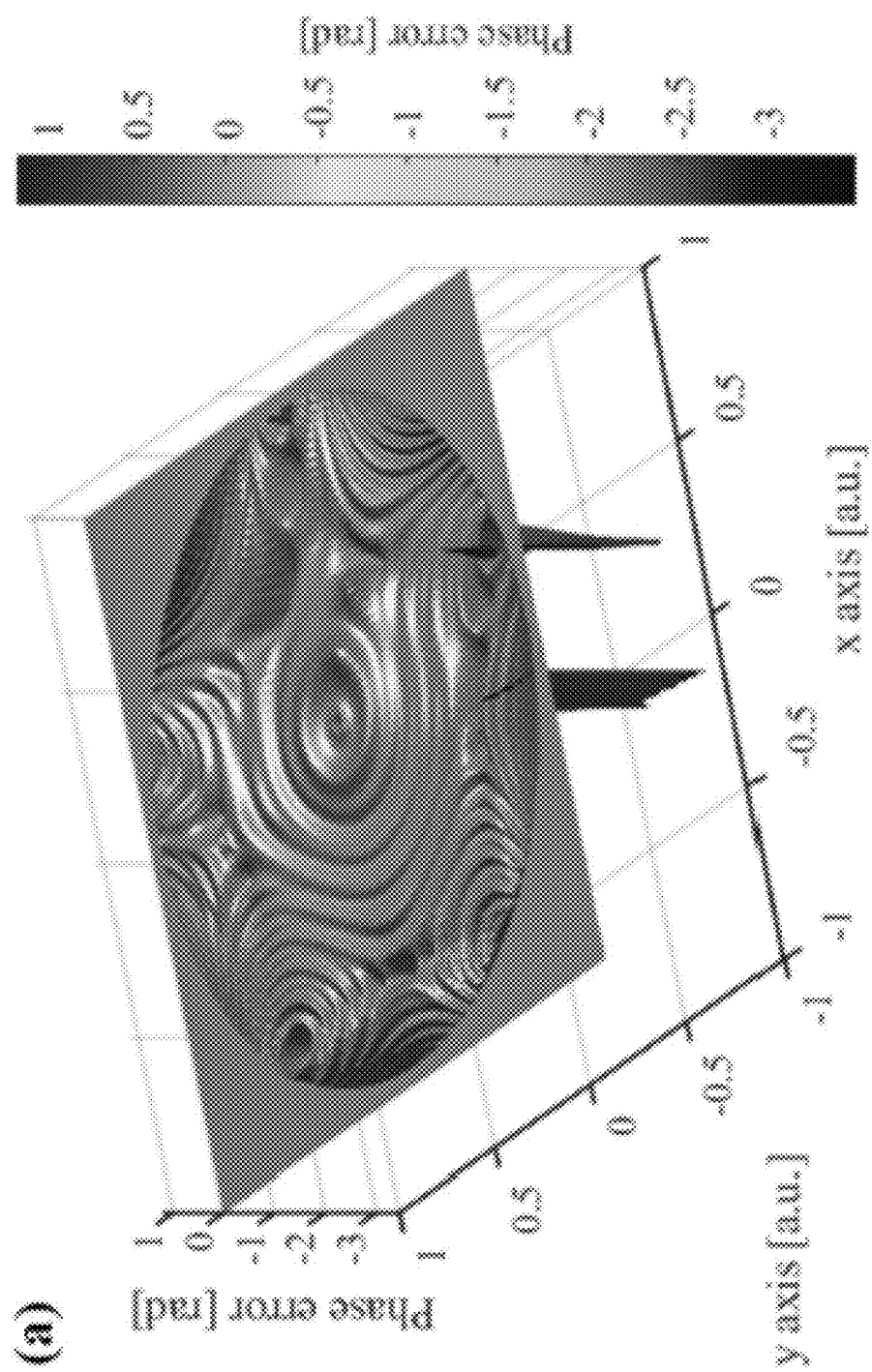
FIGS. 8A-8C show phase error maps obtained using example (a) spatial (FIG. 8A), (b) spatial-temporal (FIG. 8B), or (c) temporal (FIG. 8C) phase demodulation methods.

The phase error of the three example phase demodulation methods was compared. The absolute phase error obtained with the spatial phase demodulation method is shown in FIG. 8A. Two waving errors can be observed: strong distorting waves caused by the Vortex transform, and other waves by the spatial band-pass filtering. The root-mean-square error (RMSE) of the example spatial method was 0.139 radians.

Figure 8B:
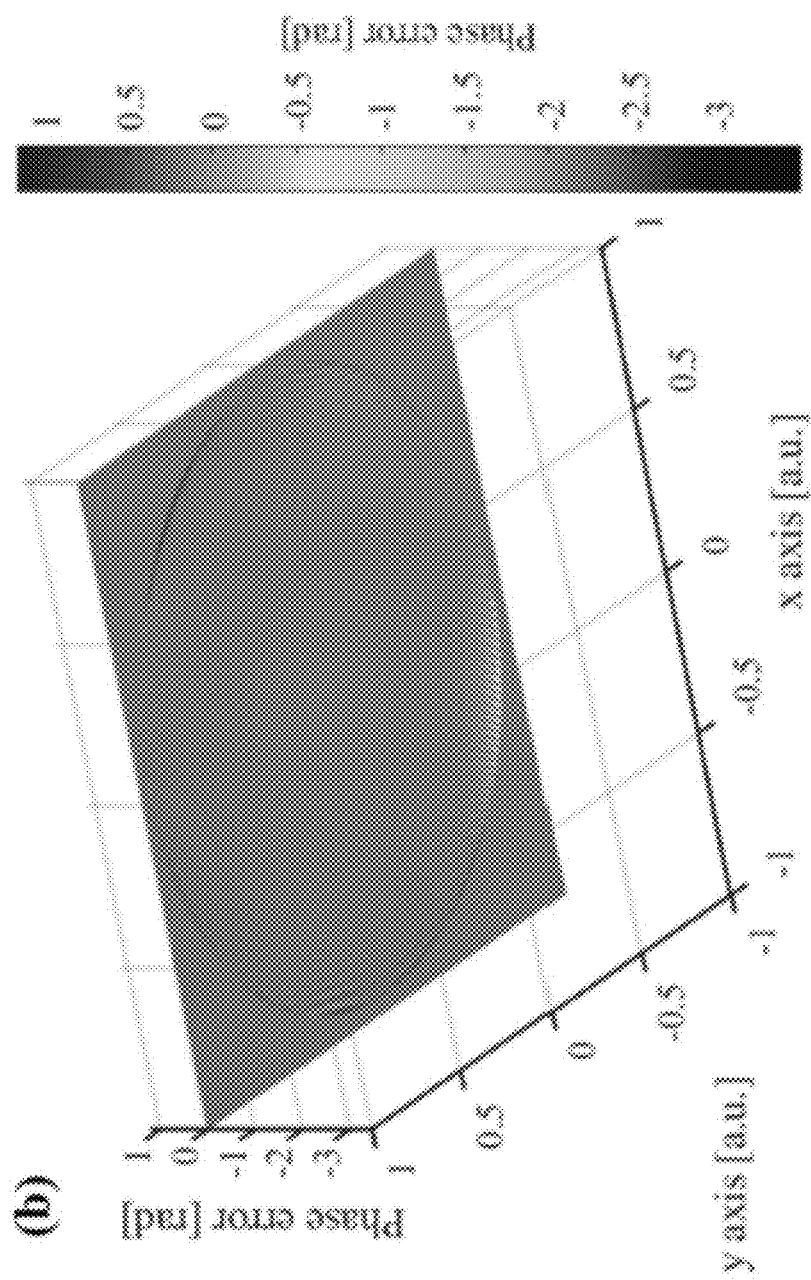

FIG. 8B depicts the phase error of the example spatial-temporal method using three moiré patterns. Because the PSA exactly retrieved the phase, the phase error was caused by the spatial filtering. It can be observed that the distorting waves whose amplitude is around 0.01 radians and the phase error become higher around the borders of the unit circle. The RMSE of the spatial-temporal method was 0.016 radians.

Figure 8C:
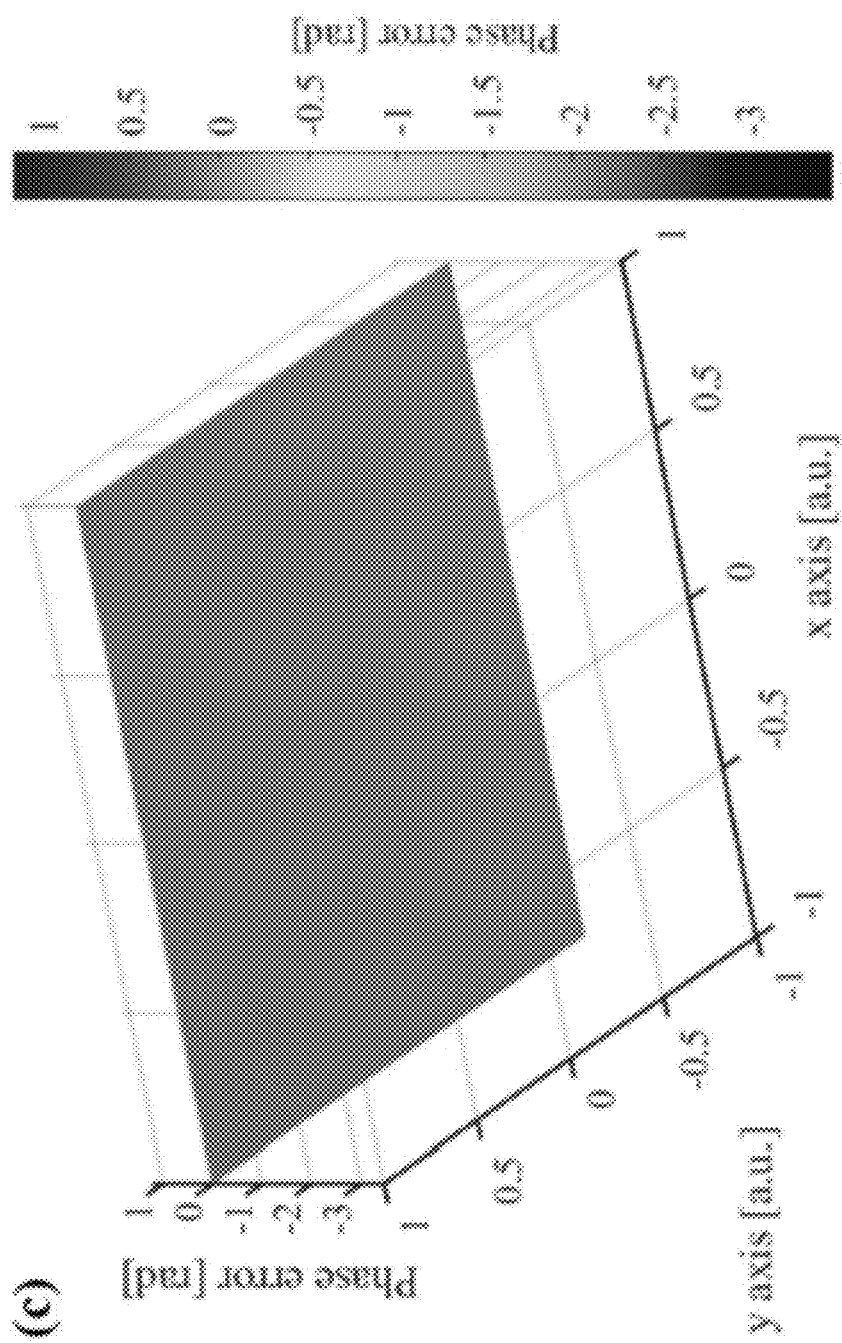

FIG. 8C depicts the phase error of the example temporal method. It can be observed that the error is zero through the error map.

Figure 8D:
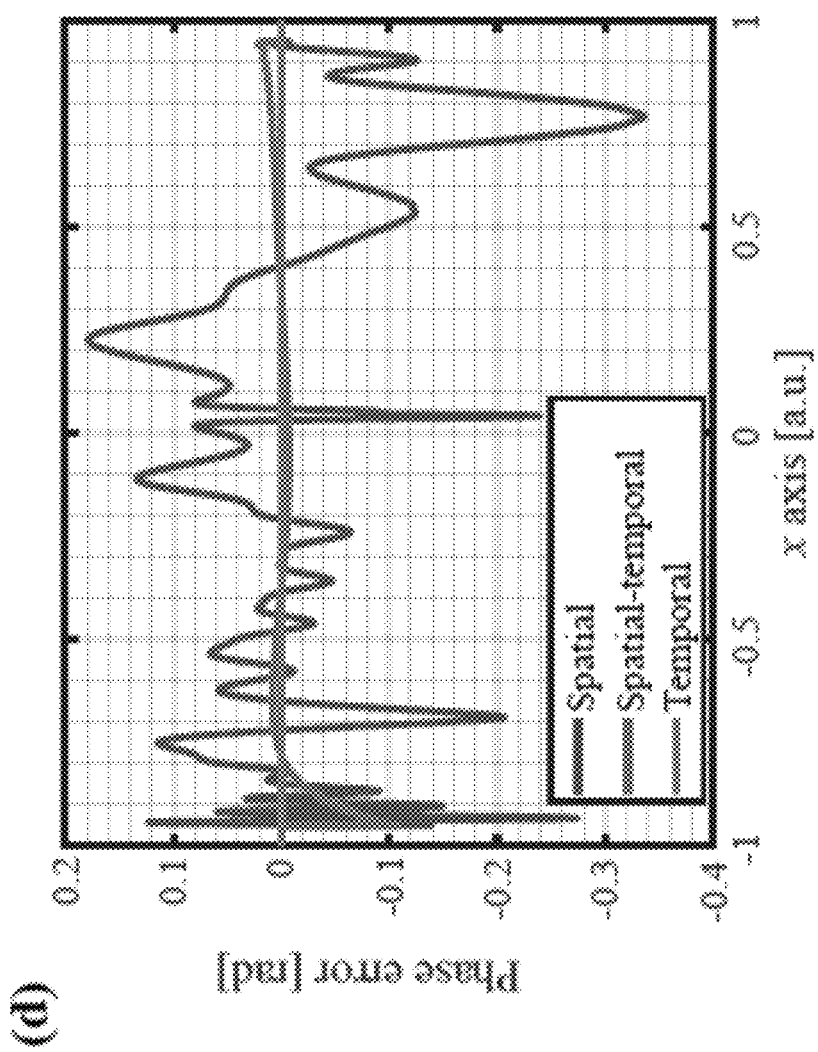
FIG. 8D shows the comparison of the phase errors along a horizontal cut.

FIG. 8D plots horizontal cuts along the x-axis of the phase errors. This plot shows that the absolute errors of the example spatial, spatial-temporal, and temporal methods were around 0.2, 0.01, and 0 radians, respectively.

Laboratory Experiments

The phase demodulation methods were further validated by laboratory experiments. Two digital light processing (DLP) multimedia projectors with 3840×2160 pixel resolution, a CMOS camera with 5472×3648 pixel resolution, and a camera lens with a fixed focal length of 25 mm were used. The projectors and camera operated in a single-channel grayscale mode.

Figure 11:
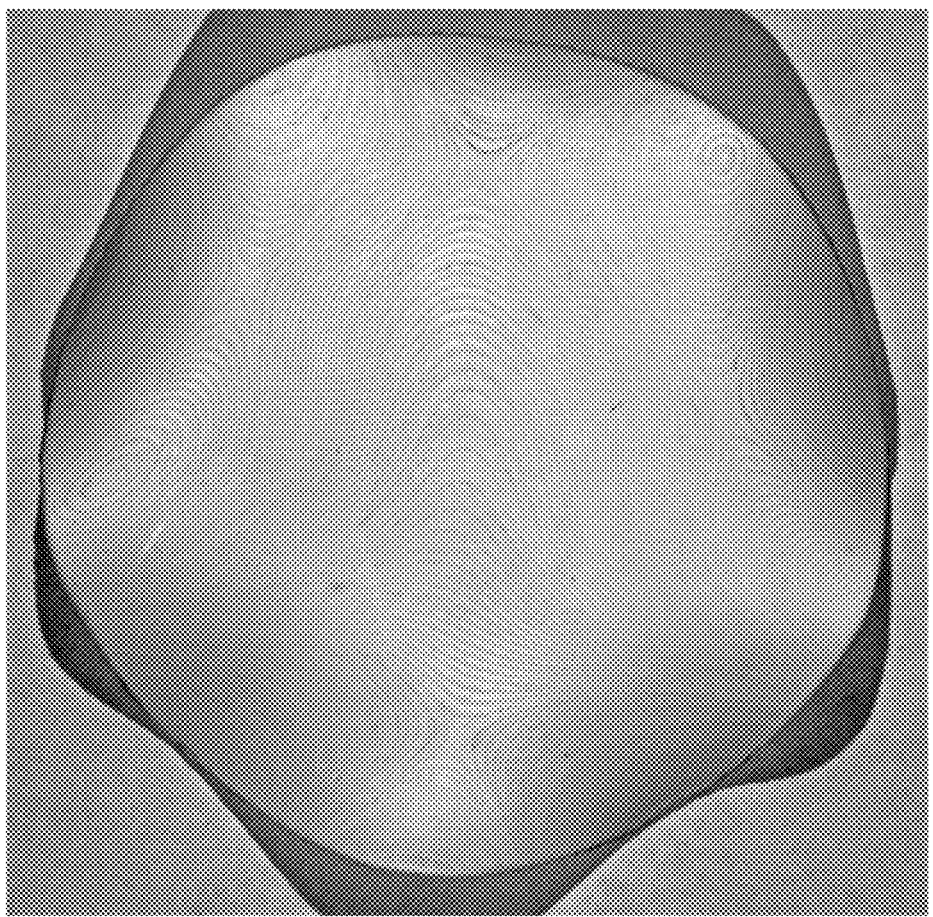
FIG. 11 shows an experimental sample of a 3D-printed Zernike polynomial.

The linear combination of the Zernike polynomials used for the simulated (numerical) experiments was fabricated using a 3D printer as shown in FIG. 11. The diameter and the height of the sample is 100 mm and 20 mm, respectively. The surface of the sample has some texture due to the staircase effect of the 3D printing. The surface topography of the 3D-printed sample was measured using example DFPMP methods with each of the three phase demodulation methods and those results are compared.

Figure 12:
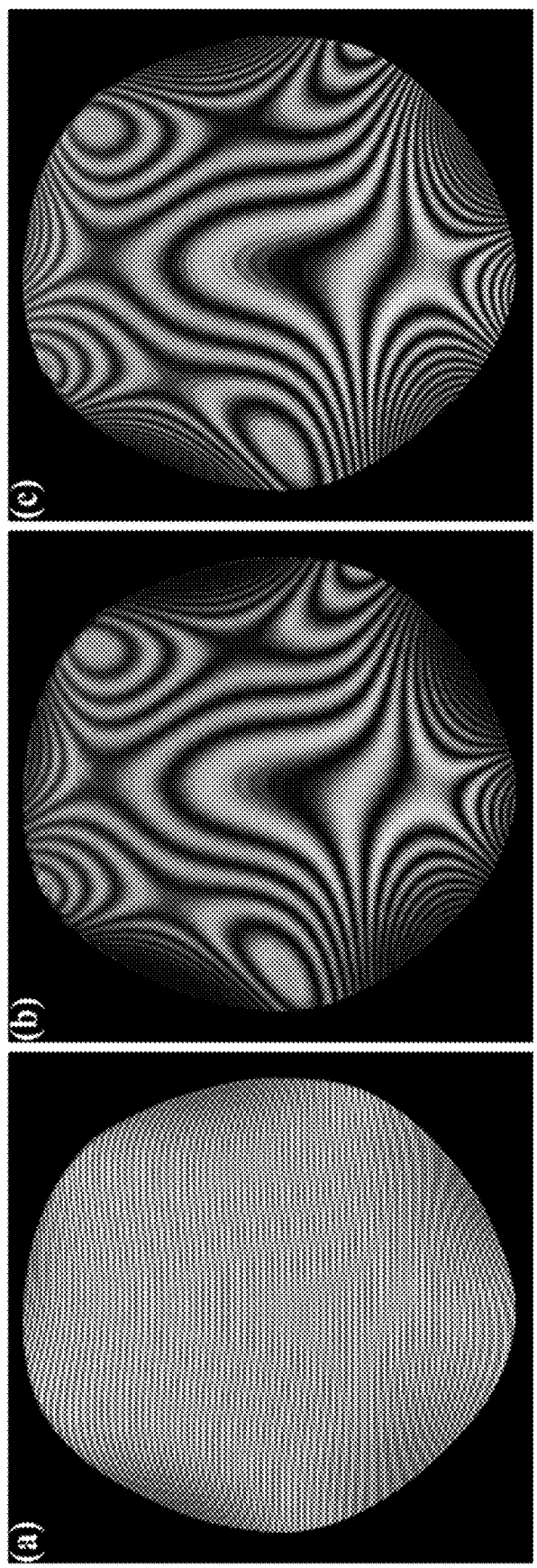
FIG. 12 shows an acquired interferometric pattern and the moiré patterns extracted from the interferometric pattern using example spatial-temporal or temporal methods, including (a) an interferometric pattern containing a moiré pattern; and moiré patterns extracted from the interferometric pattern using (b) a spatial or spatial-temporal method and (c) a temporal method.

FIG. 12 shows an acquired interferometric pattern and the moiré patterns extracted from the interferometric pattern using the spatial-temporal or temporal method. The experimental results in FIG. 12 illustrate: (a) an interferometric pattern containing a moiré pattern; as well as moiré patterns extracted from the interferometric pattern using (b) the spatial or spatial-temporal method and (c) the temporal method. The extracted moiré patterns show a good fringe visibility.

Figure 13:
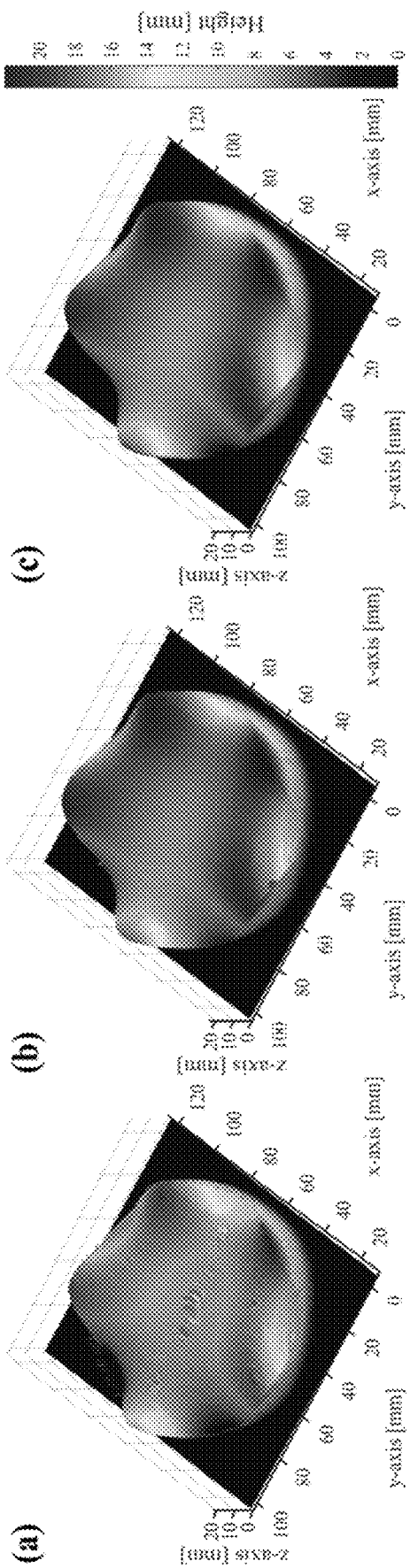
FIG. 13 shows 3D height profiles of the sample surface reconstructed in experiments by using (a) spatial, (b) spatial-temporal, and (c) temporal methods.

FIG. 13 illustrates 3D height profiles of the sample reconstructed by using the each of the spatial, spatial-temporal, and temporal phase demodulation methods. It can be observed that the estimation by the spatial method is not correct for the locations where the surface's gradient becomes zero. The spatial-temporal method estimates the surface profile correctly, but the details of the surface texture is filtered out by the spatial filter when isolating the moiré pattern. The temporal method shows correct reconstruction of the surface profile including the details of the surface texture.

General

Any of the above aspects and embodiments can be combined with any other aspect or embodiment as disclosed here in the Summary, Figures and/or Detailed Description sections.

As used in this specification and the claims, the singular forms "a," "an" and "the" include plural referents unless the context clearly dictates otherwise.

Unless specifically stated or obvious from context, as used herein, the term "or" is understood to be inclusive and covers both "or" and "and".

Unless specifically stated or obvious from context, as used herein, the term "about" is understood as within a range of normal tolerance in the art, for example within 2 standard deviations of the mean. About can be understood as within 20%, 19%, 18%, 17%, 16%, 15%, 14%, 13%, 12%, 11%, 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Unless specifically stated or obvious from context, as used herein, the terms "substantially all", "substantially most of", "substantially all of" or "majority of" encompass at least about 90%, 95%, 97%, 98%, 99%, or 99.5%, or more of a referenced amount of a composition.

The entirety of each patent, patent application, publication and document referenced herein hereby is incorporated by reference. Citation of the above patents, patent applications, publications and documents is not an admission that any of the foregoing is pertinent prior art, nor does it constitute any admission as to the contents or date of these publications or documents. Incorporation by reference of these documents, standing alone, should not be construed as an assertion or admission that any portion of the contents of any document is considered to be essential material for satisfying any national or regional statutory disclosure requirement for patent applications. Notwithstanding, the right is reserved for relying upon any of such documents, where appropriate, for providing material deemed essential to the claimed subject matter by an examining authority or court.

Modifications may be made to the foregoing without departing from the basic aspects of the invention. Although the invention has been described in substantial detail with reference to one or more specific embodiments, those of ordinary skill in the art will recognize that changes may be made to the embodiments specifically disclosed in this application, and yet these modifications and improvements are within the scope and spirit of the invention. The invention illustratively described herein suitably may be practiced in the absence of any element(s) not specifically disclosed herein. Thus, for example, in each instance herein any of the terms "comprising", "consisting essentially of", and "consisting of" may be replaced with either of the other two terms. Thus, the terms and expressions which have been employed are used as terms of description and not of limitation, equivalents of the features shown and described, or portions thereof, are not excluded, and it is recognized that various modifications are possible within the scope of the invention. Embodiments of the invention are set forth in the following claims.

A number of embodiments of the invention have been described. Nevertheless, it can be understood that various modifications may be made without departing from the spirit and scope of the invention. Accordingly, other embodiments are within the scope of the following claims.

What is claimed is:

1. A moiré profilometry method for analyzing a topography of an object, the method comprising:
   simultaneously projecting dual patterns onto a surface of the object from two symmetric directions, the projected dual patterns superimposing and generating a fringe pattern that contains a moiré pattern, the moiré pattern having a phase that is modulated according to the topography of the object;
   extracting the moiré pattern from the fringe pattern using a spatial or temporal method; and
   demodulating the phase from the extracted moiré pattern using a spatial or temporal method;
   wherein the extracting uses a spatial filtering method and the demodulating uses a temporal phase demodulation method.

2. A moiré profilometry method for analyzing a topography of an object, the method comprising:
   simultaneously projecting dual patterns onto a surface of the object from two symmetric directions, the projected dual patterns superimposing and generating a fringe pattern that contains a moiré pattern, the moiré pattern having a phase that is modulated according to the topography of the object;
   extracting the moiré pattern from the fringe pattern using a spatial or temporal method; and
   demodulating the phase from the extracted moiré pattern using a spatial or temporal method;
   wherein the extracting uses a temporal extraction method and the demodulating uses a temporal phase demodulation method.

3. A moiré profilometry method for analyzing a topography of an object, the method comprising:
   simultaneously projecting dual patterns onto a surface of the object from two symmetric directions, the projected dual patterns superimposing and generating a fringe pattern that contains a moiré pattern, the moiré pattern having a phase that is modulated according to the topography of the object;
   extracting the moiré pattern from the fringe pattern using a spatial or temporal method; and
   demodulating the phase from the extracted moiré pattern using a spatial or temporal method;
   wherein the extracting uses a spatial filtering method; and wherein the spatial filtering method further comprises determining a temporal sequence of the fringe pattern.

4. A moiré profilometry method for analyzing a topography of an object, the method comprising:
   simultaneously projecting dual patterns onto a surface of the object from two symmetric directions, the projected dual patterns superimposing and generating a fringe pattern that contains a moiré pattern, the moiré pattern having a phase that is modulated according to the topography of the object;
   extracting the moiré pattern from the fringe pattern using a spatial or temporal method; and
   demodulating the phase from the extracted moiré pattern using a spatial or temporal method;
   wherein the demodulating uses a temporal phase demodulation method; and wherein the temporal extraction method uses a phase shifting algorithm (PSA).

5. A moiré profilometry method for analyzing a topography of an object, the method comprising:
   simultaneously projecting dual patterns onto a surface of the object from two symmetric directions, the projected dual patterns superimposing and generating a fringe pattern that contains a moiré pattern, the moiré pattern having a phase that is modulated according to the topography of the object;
   extracting the moiré pattern from the fringe pattern using a spatial or temporal method; and
   demodulating the phase from the extracted moiré pattern using a spatial or temporal method;
   wherein the demodulating uses a temporal phase demodulation method that includes using a phase shifting algorithm (PSA).

6. A system for moiré profilometry comprising:
   first and second projectors having exit pupils disposed along a first plane that is separated by a distance from a reference plane, the first and second projectors being configured to simultaneously project dual patterns onto a surface of an object disposed between the reference plane and the first plane such that the projected dual patterns superimpose and generating a fringe pattern that contains a moiré pattern, the moiré pattern having a phase that is modulated according to the topography of the object;
   an imaging apparatus having an entrance pupil coplanar with the exit pupils of the first and second projectors, the entrance pupil being configured to receive a reflection of the fringe pattern from the object;
   a processor coupled to the imaging apparatus and configured to:
      extract the moiré pattern from the fringe pattern using a spatial or temporal method; and
      demodulate the phase from the extracted moiré pattern using a spatial or temporal method;
   wherein the extracting uses a spatial filtering method and the demodulating uses a temporal phase demodulation method.

7. A system for moiré profilometry comprising:
   first and second projectors having exit pupils disposed along a first plane that is separated by a distance from a reference plane, the first and second projectors being configured to simultaneously project dual patterns onto a surface of an object disposed between the reference plane and the first plane such that the projected dual patterns superimpose and generating a fringe pattern that contains a moiré pattern, the moiré pattern having a phase that is modulated according to the topography of the object;
   an imaging apparatus having an entrance pupil coplanar with the exit pupils of the first and second projectors, the entrance pupil being configured to receive a reflection of the fringe pattern from the object;
   a processor coupled to the imaging apparatus and configured to:
      extract the moiré pattern from the fringe pattern using a spatial or temporal method; and
      demodulate the phase from the extracted moiré pattern using a spatial or temporal method;
   wherein the extracting uses a temporal extraction method and the demodulating uses a temporal phase demodulation method.

8. A system for moiré profilometry comprising:
   first and second projectors having exit pupils disposed along a first plane that is separated by a distance from a reference plane, the first and second projectors being configured to simultaneously project dual patterns onto a surface of an object disposed between the reference plane and the first plane such that the projected dual patterns superimpose and generating a fringe pattern that contains a moiré pattern, the moiré pattern having a phase that is modulated according to the topography of the object;

an imaging apparatus having an entrance pupil coplanar with the exit pupils of the first and second projectors, the entrance pupil being configured to receive a reflection of the fringe pattern from the object;

a processor coupled to the imaging apparatus and configured to:
- extract the moiré pattern from the fringe pattern using a spatial or temporal method; and
- demodulate the phase from the extracted moiré pattern using a spatial or temporal method;

wherein the extracting uses a spatial filtering method; and wherein the spatial filtering method further comprises determining a temporal sequence of the fringe pattern.

9. A system for moiré profilometry comprising:

first and second projectors having exit pupils disposed along a first plane that is separated by a distance from a reference plane, the first and second projectors being configured to simultaneously project dual patterns onto a surface of an object disposed between the reference plane and the first plane such that the projected dual patterns superimpose and generating a fringe pattern that contains a moiré pattern, the moiré pattern having a phase that is modulated according to the topography of the object;

an imaging apparatus having an entrance pupil coplanar with the exit pupils of the first and second projectors, the entrance pupil being configured to receive a reflection of the fringe pattern from the object;

a processor coupled to the imaging apparatus and configured to:
- extract the moiré pattern from the fringe pattern using a spatial or temporal method; and
- demodulate the phase from the extracted moiré pattern using a spatial or temporal method;

wherein the extraction uses a temporal extraction method; and wherein the temporal extraction method uses a phase shifting algorithm (PSA).

10. A system for moiré profilometry comprising:

first and second projectors having exit pupils disposed along a first plane that is separated by a distance from a reference plane, the first and second projectors being configured to simultaneously project dual patterns onto a surface of an object disposed between the reference plane and the first plane such that the projected dual patterns superimpose and generating a fringe pattern that contains a moiré pattern, the moiré pattern having a phase that is modulated according to the topography of the object;

an imaging apparatus having an entrance pupil coplanar with the exit pupils of the first and second projectors, the entrance pupil being configured to receive a reflection of the fringe pattern from the object;

a processor coupled to the imaging apparatus and configured to:
- extract the moiré pattern from the fringe pattern using a spatial or temporal method; and
- demodulate the phase from the extracted moiré pattern using a spatial or temporal method;

wherein the demodulating uses a temporal phase demodulation method that includes using a phase shifting algorithm (PSA).

* * * * *